Feb. 5, 1963  R. S. STRIMEL  3,076,331
TESTING MACHINES
Filed Nov. 6, 1959

INVENTOR
Robert S. Strimel
BY
Synnestvedt & Lechner
ATTORNEYS

United States Patent Office 3,076,331
Patented Feb. 5, 1963

3,076,331
TESTING MACHINES
Robert S. Strimel, Penllyn, Pa., assignor to Tinius Olsen Testing Machine Company, Willow Grove, Pa., a corporation of Pennsylvania
Filed Nov. 6, 1959, Ser. No. 851,355
4 Claims. (Cl. 73—88)

This invention relates to hydraulic type testing machines for stressing a specimen in compression, tension and the like and, in particular, the invention relates to apparatus to compensate the stress indicating means of the machine for changes in piston tare weight.

Hydraulic type testing machines usually include a fixed cylinder within which is a piston and by supplying fluid to the cylinder chamber the piston is moved so that a specimen appropriately supported in the machine will be stressed in compression, tension, flexure and the like. Commonly known arrangements for indicating stress are operated on the principle that the fluid pressure in the cylinder is directly proportional to the stress applied to the specimen. Thus, such arrangements are directly coupled to the cylinder to sense the fluid pressure and indicate its value, the indication ordinarily being in pounds.

The piston and other machine components connected to the same, of course, have weight and this weight acting on the fluid in the cylinder constitutes a means for developing fluid pressure. For example, in certain hydraulic type testing machines with which I am familiar, this weight may develop fluid pressures in the order of 7 to 20 p.s.i., depending upon the size of the machine. This pressure is additive to the pressure developed as a result of the piston reacting against the specimen. Since neither the fluid pressure in the loading chamber nor the indicating system coupled thereto can discriminate as between causes of fluid pressure, the weight of the piston constitutes a source of error. At very high loads or stress on a specimen, the error due to the piston weight may be small as compared to the pressure due to the reaction against the specimen and, therefore, may be ignored. However, at smaller loads the error due to the weight of the piston may be a substantial part or even more than the pressure due to the reaction against the specimen. It will be apparent that to eliminate this source of error is a highly desirable objective.

Regarding the above, I have discovered that the effective weight of the piston changes with change in position of the piston along the cylinder axis and that, therefore, it is impossible to eliminate the error by way of simple calibration procedure. For example, if the piston is moved to the start position of a test, the weight of the piston may be taken into account by setting the indicating mechanism for zero reading. However, as the piston is moved during the stressing of the specimen, the effective weight will change and the initial compensation will no longer be true.

According to my discovery the change in effective weight of the piston is due to changes in buoyancy, the buoyancy force being proportional to the weight of the fluid displaced by the piston. For example, when the piston is slightly spaced from the bottom of the cylinder the buoyancy force is proportional to the weight of a volume of fluid equivalent to the volume of the piston within the cylinder and when the piston is moved, say half-way through its total possible movement, the buoyancy force is proportional to the weight of volume of fluid equal to the remaining volume of the piston within the cylinder. The buoyancy effect decreases as the piston moves out of the cylinder and, therefore, the effective weight of the piston increases. Therefore, the force of the piston on the fluid increases. The effect of this, of course, is to increase the fluid pressure in the cylinder and such increase being sensed and measured by the indicating means causes the same to be in error.

The principal object of this invention is to overcome the foregoing and for this purpose the invention contemplates providing for the controlling of the indicator means by mechanism which is operative as a function of the position of the piston along the axis of the cylinder so as to provide continuous compensation for change in piston buoyancy.

The principle of the invention will be understood by those skilled in the art from the following description and drawings wherein.

Figure 1:
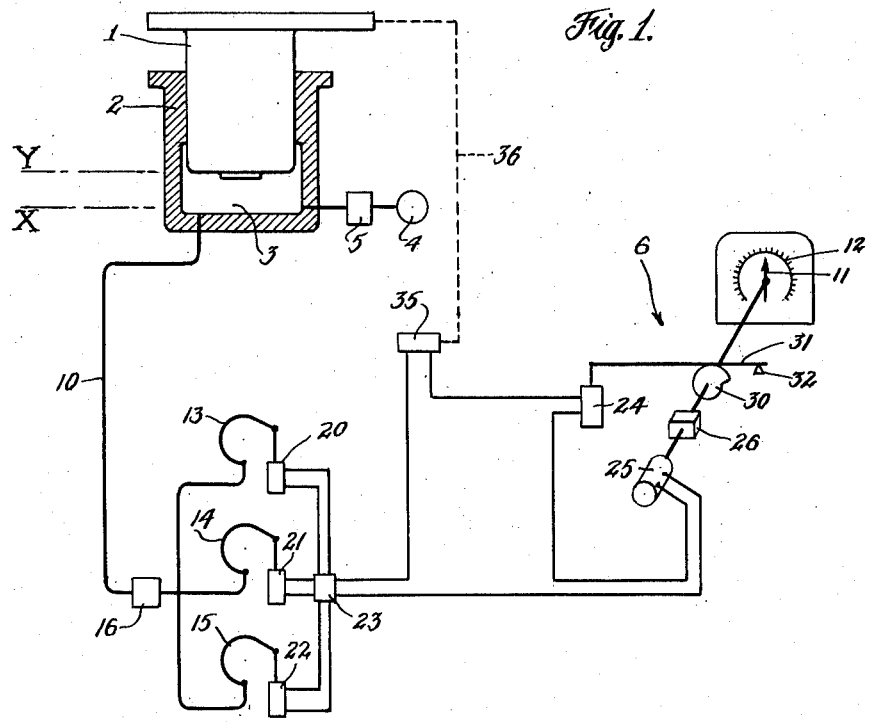
FIGURE 1 is a diagrammatic view showing a typical piston and cylinder and stress indicator arrangements for use in a testing machine and having the invention incorporated therein.

In FIGURE 1 the piston is indicated by the numeral 1 and the cylinder indicated by the numeral 2. The cylinder has a loading chamber 3 which is supplied with fluid from a pump 4 via a control mechanism 5. As fluid is forced into the loading chamber the piston is moved up and when the loading chamber is connected to exhaust, the weight of the piston causes the same to move down. The foregoing elements are all of standard construction.

The stress measuring and indicating mechanism is identified by the numeral 6 and is of the type which senses or measures the fluid pressure in the loading chamber 3 and provides a visual indication of this pressure by means of the indicator comprising the pointer 11 operating over the scale 12. The scale 12 is usually calibrated in terms of pounds. As will be understood by those in the art, an indicating system of the kind mentioned may take several different forms and is usually of the servo mechanism type and may be arranged in the form of a null balance system or in the form of a bridge circuit. The particular system disclosed herein is of the null balance type such as shown in my Patent 2,808,721. In certain instances the indicating system may be a mechanical type.

A plurality of fluid operated devices such as Bourdon tubes 13, 14 and 15 are interconnected to a valve 16 which is arranged to selectively interconnect any one of the Bourdon tubes with the line 10 and hence with the loading chamber 3. The Bourdon tubes provide for operation over several ranges of pressures, for example, the tube 13 may be used in the low pressure area, the tube 14 in the intermediate area, and the tube 15 in the high pressure area. These tubes are respectively connected to control elements 20, 21 and 22. These elements are conventional differential transformers, the cores of which are respectively connected to the Bourdon tubes. As a tube is moved under the influence of the change in pressure in the loading chamber 3, the core is moved up (or down) so as to generate an electrical signal which is proportional to the fluid pressure in the chamber. The elements 20, 21 and 22 are interconnected to a switching mechanism 23 which is mechanically coupled to the valve 16 and is arranged to condition a control element for operation in accordance with the Bourdon tube connected to the loading chamber. The switch 23 is connected to a balancing control element 24 which is adapted to produce a signal which is in phase opposition to the signal of the particular control element selected for operation. The output or resultant signal is used to drive a servo motor 25 which is connected to drive the pointer 11. The operation of the balancing element 24 is controlled by feedback from the motor and this is accomplished by means of the mechanical system including the gears 26, cam 30 and lever 31 which, being pivoted at 32, is moved in accordance with the rotation of the cam 30. The lever 31 is coupled to the core of the balancing element 24 and thereby controls the developed signal. The circuit operates on the principle that when a signal from one of the control elements drives the motor 25, the same will be turned so as to move the arm 31 to develop a signal in the balancing element 24 which is in opposition to the signal from the control element. When the resultant signal is zero, the motor stops turning. Since the motor is connected to drive the pointer 11, the pointer will indicate the pressure in chamber 3 or the load applied to the specimen.

Figure 3:
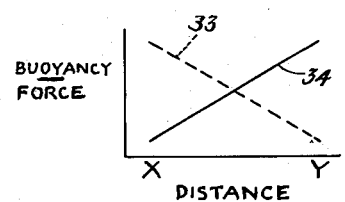
FIGURE 3 is a graph generally illustrating the relationship between the pressure in the cylinder due to the effective weight of the piston and the position of the piston along the axis of the cylinder.

As mentioned heretofore, the weight of the piston 1 causes a corresponding pressure to be developed in the loading chamber 3 and this pressure varies with the position of the piston along the axis of the cylinder. This is explained following. In the graph of FIGURE 3, the dotted line 33 represents the buoyancy effect and the full line 34 represents the weight of the piston or the force which it exerts on the fluid. When the piston is spaced slightly from the bottom of the cylinder, for example at X distance in FIGURE 1, the buoyancy effect is highest and the effective weight of the piston or the force which it exerts on the fluid is lowest. As the piston moves outwardly of the cylinder, say to the position Y, the buoyancy effect is smaller and the force which the piston exerts on the fluid is greater. Thus, at position X the p.s.i. in the loading chamber due to the piston is smaller than the p.s.i. at position Y.

My preferred manner to compensate for the foregoing is to include in the motor drive circuit a compensating control element 35 which may be arranged to continuously subtract from the control element signal as the piston moves out of the cylinder or, alternatively, to add to the signal of the balancing control element 24 as the piston moves out of the cylinder. In other words, the compensating control element 35 develops a signal which corrects or compensates for the increase in pressure due to the movement of the piston out of the cylinder.

Figure 2:
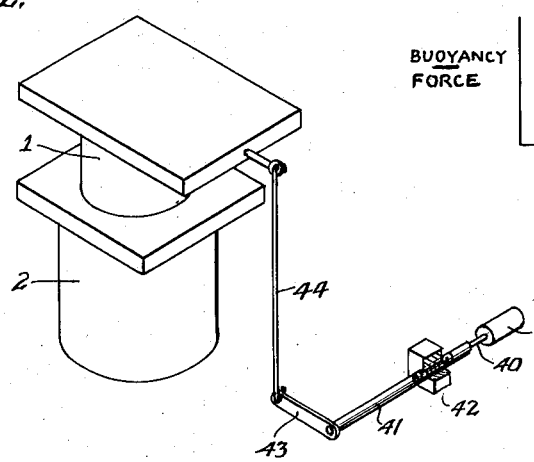
FIGURE 2 is a diagrammatic, isometric view of a typical piston and cylinder arrangement and showing mechanism which is responsive to the change in the position of the piston along the axis of the cylinder.

The dotted lines 36 indicate mechanism interconnected between the compensating element and the piston to operate the element as a function of piston position. A typical mechanism for this purpose is illustrated in FIGURE 2. The compensating element 35 has its core stem 40 connected to a micrometer screw 41 which operates in the nut 42 fixedly held in position. The screw 41 is adapted to be rotated by the linkage comprising the arm 43 fixedly secured to the screw and the arm 44, one end of which is pivotally connected to the arm 43 and the other end pivotally connected to the piston. It will be apparent that as the piston is moved up, the arm 43 is rotated clockwise which causes a rotation of the screw and the screw being fixed in the nut, is moved axially to move the core of the compensating element 35.

It will be recalled that the circuit of my Patent 2,808,721 includes a plurality of zeroing control elements which are selectively connectible in the circuit and are used for zeroing or trimming the circuit at the start of an operation. Such control is desirable in the event, for example, that the tip of the Bourdon tube is not always in the same place under no load conditions. Displacement of the Bourdon tube would, of course, develop a signal and the zeroing control elements provide a means for blocking this out. For reasons of simplicity I have not included the zeroing control elements herein.

I claim:

1. In a testing machine having a piston and cylinder for stressing a test specimen together with motor driven means for indicating the stress, apparatus to compensate for change in piston buoyancy with change in position of the piston along the axis of the cylinder comprising: a circuit to develop an output signal to operate the motor, the circuit having a control element for developing a signal proportional to the fluid pressure in the cylinder, a balancing element for developing a signal to balance the signal of the control element and a compensating element for developing a signal proportional to the position of the piston along the cylinder axis to modulate one of said signals, the output signal of the circuit being the algebraic sum of three said signals; and means connected between the piston and the compensating element for operating the element in accordance with the position of the piston along the axis of the cylinder.

2. A construction in accordance with claim 1 wherein said elements all are differential transformers and last said means includes a nut, a screw operating in said nut and connected with said balancing element and linkage connected between the screw and the piston constructed to rotate the screw with motion of the piston.

3. In a testing machine having a piston and cylinder for stressing a test specimen together with indicator means for indicating the stress: a circuit means for driving the indicator having a control element operating to develop a signal which is a function of the fluid pressure in the cylinder and a compensating element operating to develop a signal which is a function of the position of the piston in the cylinder and which changes the effect of the first said signal to provide a compensation in the circuit for change in piston buoyancy with change in piston position along the axis of the cylinder; and means connected between said piston and said compensating element to operate the element in accordance with the position of the piston in the cylinder.

4. In a testing machine having a piston and cylinder for stressing a test specimen: mechanism for measuring and indicating the stress comprising an indicator, a fluid operated device connected with said cylinder, a drive circuit for the indicator having a control element connected with said device and operating to develop a signal which is a function of the fluid pressure in the cylinder, a balancing element and means connected to the indicator and operating the balancing element to develop a signal to balance the signal of the control element; and means connected between said piston and said mechanism and operating as a function of the position of the piston along the axis of the cylinder to modulate first said signal and control the operation of the mechanism so that the stress indication of the mechanism is compensated for the effect of change of piston buoyancy with change in piston position along the axis of the cylinder.

References Cited in the file of this patent

UNITED STATES PATENTS

| 2,090,475 | Dinzl | Aug. 17, 1937 |
| 2,610,052 | Macgeorge | Sept. 9, 1952 |
| 2,766,981 | Lauler et al. | Oct. 16, 1956 |
| 2,808,721 | Strimel | Oct. 8, 1957 |